March 22, 1966 R. W. MURRAY 3,241,714
LIQUID METERING DEVICE
Filed Jan. 16, 1964 4 Sheets-Sheet 1
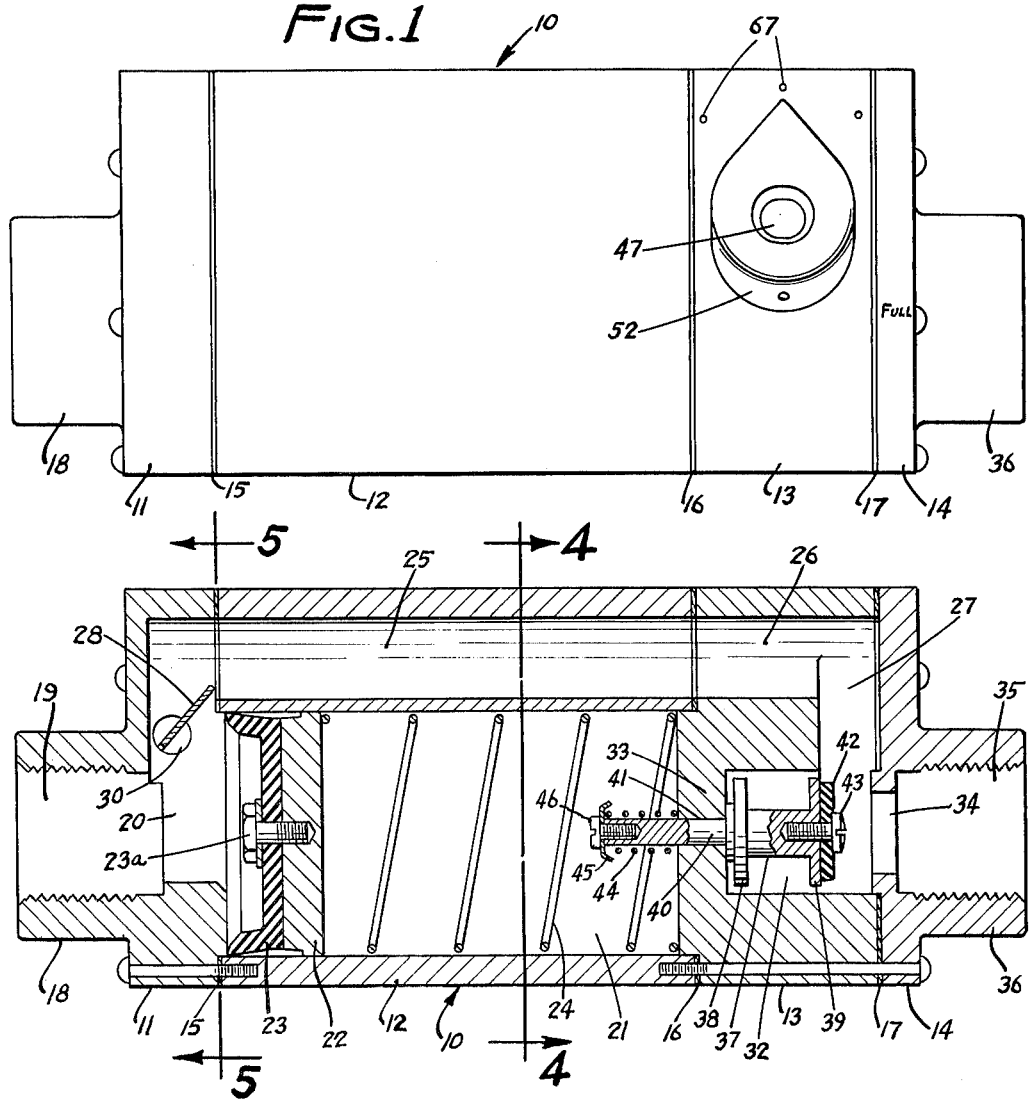
INVENTOR.
ROBERT W. MURRAY
BY Moore, White & Burd
ATTORNEYS March 22, 1966  R. W. MURRAY  3,241,714
LIQUID METERING DEVICE
Filed Jan. 16, 1964  4 Sheets-Sheet 2

INVENTOR.
ROBERT W. MURRAY
BY Moore, White & Burd
ATTORNEYS

March 22, 1966  R. W. MURRAY  3,241,714
LIQUID METERING DEVICE
Filed Jan. 16, 1964  4 Sheets-Sheet 3
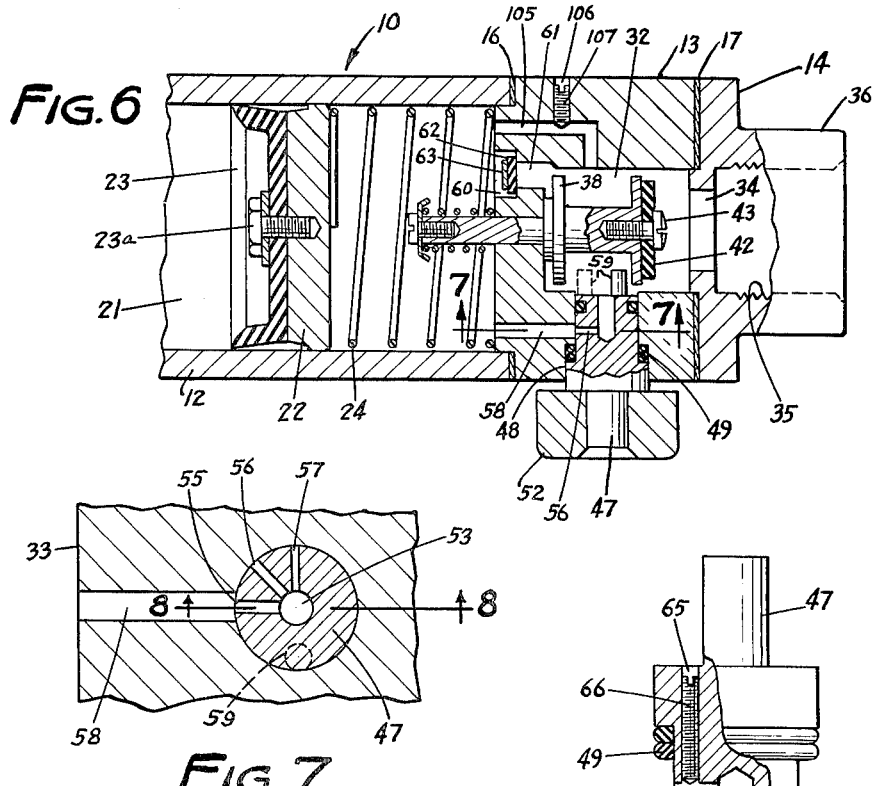
INVENTOR.
ROBERT W. MURRAY
BY Moore, White & Burd
ATTORNEYS

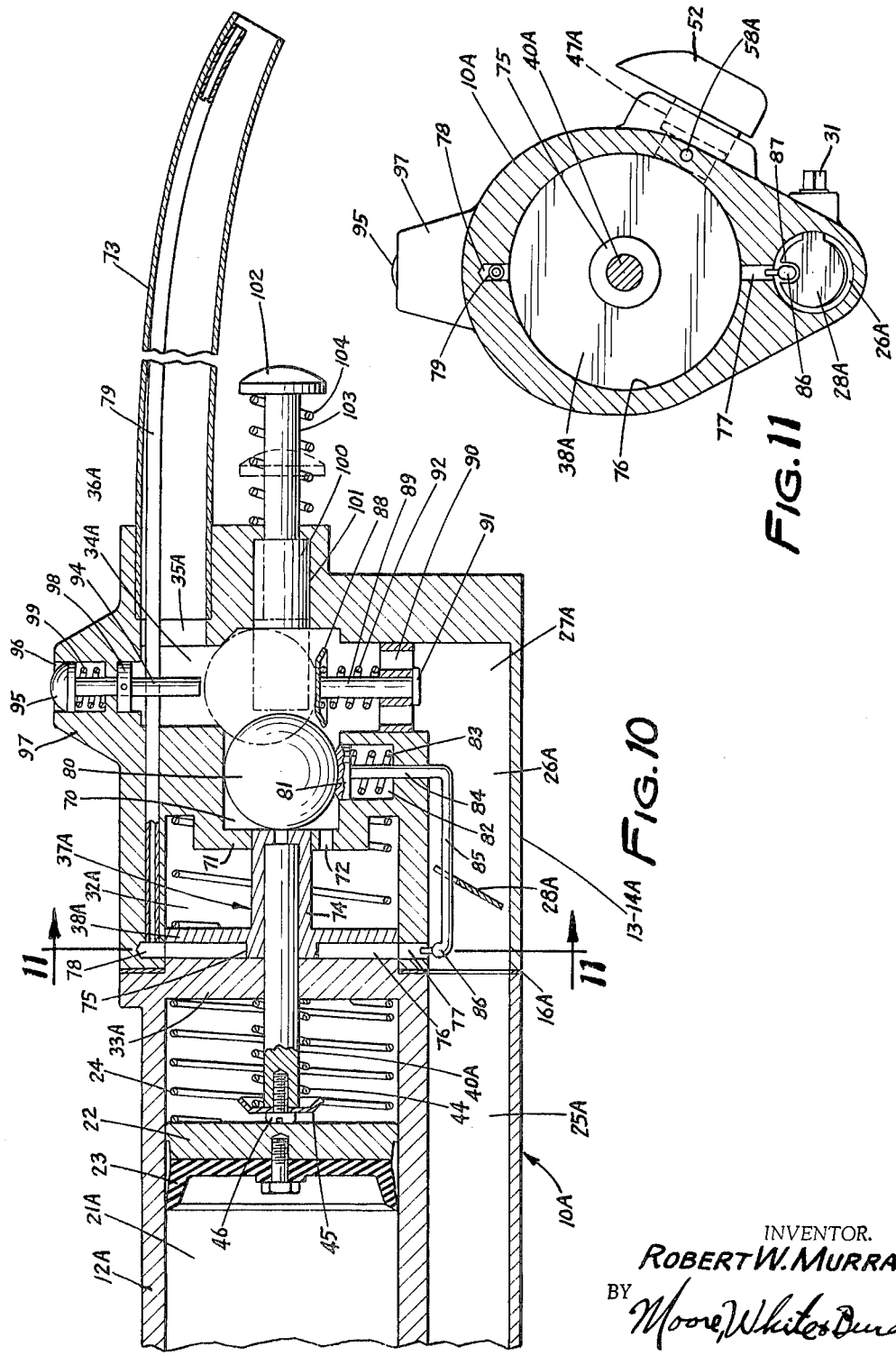

United States Patent Office
3,241,714
Patented Mar. 22, 1966

3,241,714
LIQUID METERING DEVICE
Robert W. Murray, 6340 Virginia, Brooklyn Park, Minn.
Filed Jan. 16, 1964, Ser. No. 338,093
19 Claims. (Cl. 222—20)

This invention relates to a device for metering out a predetermined volume of liquid. More particularly, this invention relates to a device for metering out a predetermined volume of gasoline or similar liquid fuel, less than a tank-full, and then automatically shutting off.

It is common practice in the marketing of gasoline automobile fuel for purchasers to order less than full tanks of fuel. Particularly in large volume, cash sale filling stations, sales are normally made in multiple of $1.00. In some instances, in the case of some juveniles and adults who must budget their expenditures closely, this is a matter of necessity. For others it is a matter of convenience in order to avoid the handling of loose change. Whatever the reasons, the practice has become well established and is well known to operators of gasoline filling stations.

In the case of a customer ordering a full tank of gasoline, automatic nozzles are available to shut off the flow of fuel when the tank becomes full, or almost full. When the customer orders less than a full tank the operator must either hand fill the tank or leave the nozzle in the tank fill tube and keep a close eye on the meter of the pump while he performs his other service functions, such as cleaning the windows, checking the oil, battery and radiator, etc. In this latter instance, there is an ever present danger of dispensing more fuel than has been ordered, or the other service suffers because of the necessity of the operator constantly watching the pump meter, or both.

The metering device of the present invention is so constructed as to permit the operator to preset the device to some predetermined amount such as $1.00's worth, $2.00's worth, or the like, and then be free to perform his other service functions without fear of over filling the tank.

The invention is illustrated in the accompanying drawings in which the same numerals identify corresponding parts and in which:

FIGURE 1 is an elevation of the metering device adapted to be fitted at the end of the hose from a gasoline fuel dispensing pump immediately ahead of the nozzle;

FIGURE 2 is a vertical longitudinal section through the metering device showing the elements in the open or non-operating position;

FIGURE 6 is a partial longitudinal section generally on the line 6—6 of FIGURE 5 and in the direction of the arrows;

FIGURE 7 is an enlarged fragmentary section on the line 7—7 of FIGURE 6 and in the direction of the arrows, but showing the control shaft turned an eighth turn to the right;

FIGURE 8 is a fragmentary section through the control shaft on thee line 8—8 of FIGURE 7;

FIGURE 9 is an enlarged fragmentary section on the line 9—9 of FIGURE 4;

FIGURE 10 is a partial vertical longitudinal section through a modified form of the metering device, in which the metering device is incorporated into an automatic nozzle of novel construction; and FIGURE 11 is a transverse section on the line 11—11 of FIGURE 10 and in the direction of the arrows.

Figure 3:
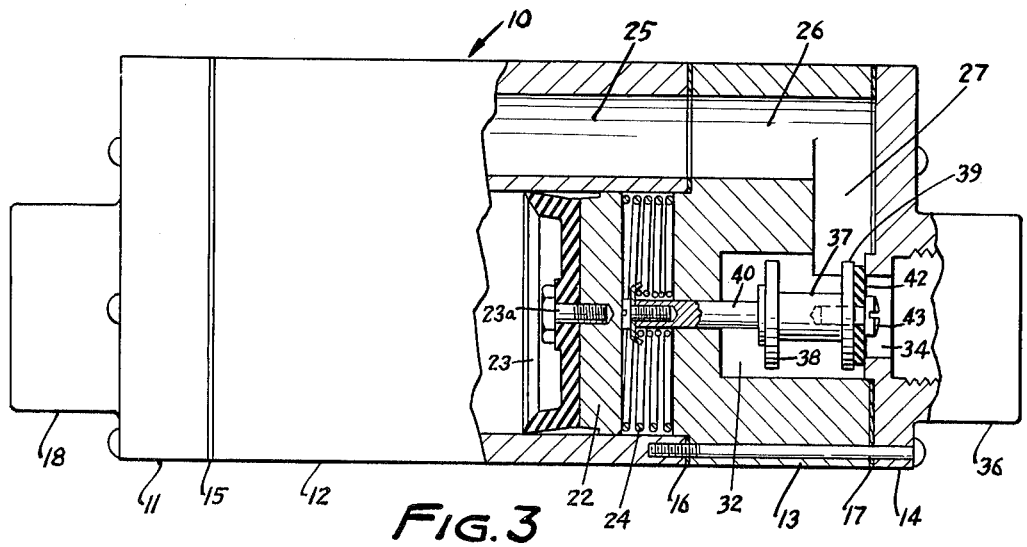
FIGURE 3 is a partial elevation and a partial vertical longitudinal section showing the same parts in closed position.
Figures 4, 5:
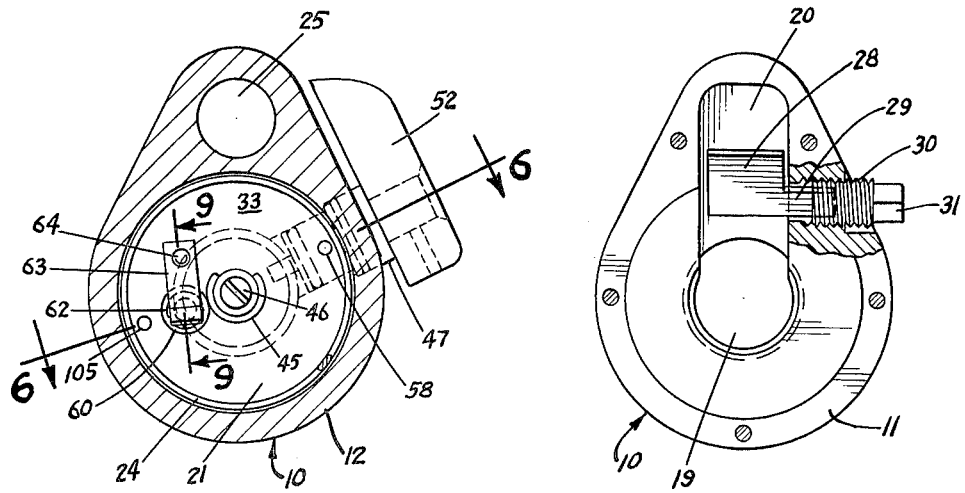
FIGURE 4 is a transverse section on the line 4—4 of FIGURE 2 and in direction of the arrows.
FIGURE 5 is a transverse section of the line 5—5 of FIGURE 2 and in the direction of the arrows.

Referring now to the drawings the metering device indicated generally at 10 is comprised of body having in sequence a pump end section 11, an elongated intermediate section 12, a control section 13, and a nozzle end section 14. A gasket 15 is interposed between end section 11 and intermediate section 12. A gasket 16 is interposed between intermediate section 12 and control section 13. A gasket 17 is interposed between control section 13 and nozzle end section 14. All of the sections are secured together tightly (as, for example, by screws or bolts) to prevent any leakage of gasoline through the gasketed joints between adjacent sections.

The pump end section 11 is provided with a projecting boss 18 adapted to serve as a fitting for attachment of the metering device to the end of the dispensing hose from a gasoline metering pump. The boss 18 is provided with a central bore 19, which is desirably threaded to facilitate fitting onto the hose end. The bore 19 serves as a passage for the flow of gasoline fuel and communicates directly with a chamber 20 in the pump end section 11 and a cylindrical chamber 21 within the intermediate section 12.

A piston 22 fit with a tight slide fit, is positioned in cylindrical chamber 21 for movement longitudinally therethrough in response to variation in fluid pressure on opposite sides of the piston. The piston is desirably formed in part of a disk 23 with slightly flaring edges composed of resilient material to insure a tight leakage free fit against the walls of the chamber and secured to piston member 22 by means of a screw 23a or like fastening means. Piston 22 is spring loaded by a compression spring 24 disposed in chamber 21 between the piston and the control section 13.

The intermediate section 12 of the metering device is also provided with a longitudinal by-pass channel 25 which communicates at one end with chamber 20 in the pump end section and at the other end with a mating by-pass channel 26 and chamber 27 in the control section 13. A loose fitting flap or butterfly type valve is disposed in chamber 20 to permit altering the rate of flow of gasoline through the metering device, but without cutting off the flow. This valve includes a flap or vane 28 having a shank 29 fitted into a threaded shaft 30 extending through the wall of the pump end section 11 and having an adjusting head 31. This valve is a compensating device for adjusting the metering device to take into account fluctuations in the price of gasoline such as may occur during price wars and the like. Its operation will be described below.

The chamber 27 in the control section 13 communicates directly with a cylindrical chamber 32 in section 13 and separated from the chamber 21 of the intermediate section by means of a transverse wall portion 33. Chamber 32 communicates directly with a discharge port 34 in nozzle end section 14. Port 34 in turn communicates directly with a central bore 35 through a boss 36 on the end of end section 14. Boss 36 functions as a fitting for attachment of the metering device to a conventional gasoline dispensing nozzle and bore 35 is desirably threaded to facilitate attachment of a nozzle.

A spool piston valving element 37 which is axially aligned with chamber 21 and port 34 functions as a shut-off for discharge port 34. The valving member 37 includes spaced apart annular flanges 38 and 39 positioned for movement in chamber 32 and a central longitudinally extending shank or stem 40 which passes with a slide fit through a central opening 41 in wall member 33. A resilient valving disk or washer 42 is secured to the exposed face of flange 39 by means of a suitable fastener, such as screw 43. Resilient disk 42 is of greater diameter than port 34 so that when the valving piston 37 is in its forward most position (as shown in FIGURE 3) the resilient disk shuts off flow through port 34.

The valve spool piston 37 is spring loaded to normally remain in the open position. This is accomplished by means of a compression spring 44 surrounding the end of shank or stem 40 within chamber 21 and held in place by means of a retaining ring 45 and a suitable fastener, such as screw 46.

As best shown in FIGURES 6 and 7, the structure of the control section includes a rotatable shaft 47 set into a recess 48 extending radially through the side of wall of control section 13 into the central chamber 32. Shaft 47 and recess 48 are each provided with cooperating shoulders against which packing rings 49 are pressed to insure a leak-proof fit. The opposite end of control shaft 47 is also desirably provided with an annular recess 50 fitted with an O-ring 51. Shaft 47 is rotatable by means of the external control knob 52.

Control shaft 47 is provided with a central channel 53 which extends from the inward end of the shaft for part of its length. A plurality of radial control apertures 55, 56 and 57 of different diameters extend through the wall of the control shaft 47 to communicate with the central channel 53 therein. A small diameter gasoline passage 58 extends through the wall of the control section 13 so as to permit direct fluid communication between chamber 21 and one of the control apertures 55, 56, or 57 and to permit liquid flow into central channel 53 and chamber 32. While channel 58 is of small diameter it should be of greater diameter than that of any one of the control apertures. Similarly, the diameter of channel 53 should be greater than the diameter of any of the control apertures.

The most innermost end of control shaft 47 is provided with a projecting pin or lug 59 which extends into chamber 32 between flanges 38 and 39 of the valve and functions as a cam means. When control knob 52 is turned so as to position pin 59 in the position shown in broken lines in FIGURE 6, then the valve piston is rendered inoperative to close the discharge port 34, as explained in greater detail hereinafter.

The side of wall 33 facing toward chamber 21 is provided with a recess 60 which communicates with a channel 61 of lesser diameter leading into chamber 32 of the control section. A resilient disk valving member 62 is fitted into recess 60 over the end of channel 61 and held in place by a retaining means 63, such as a light leaf spring. Valving element 62 permits one way flow through channel 61 from chamber 32 to chamber 21 while preventing flow in the opposite direction. The retainer is secured by any suitable means 64, such as a screw, pin, rivet or the like. Channel 61 is for more rapid refill of chamber 21 to return piston 21 to its neutral position. For this reason channel 61 should be of substantially greater cross sectional area than any of the control apertures.

As shown in FIGURE 8, an adjustment means for regulating the rate of flow through each of the control channels 55, 56 and 57 is provided by a threaded longitudinal channel 65 fitted with a set screw 66 which is accessible by removing control knob 52. By adjustment of set screw 66 the cross sectional area of the control aperture can be reduced so as to reduce the rate of flow through it.

Suitable indicia 67 are provided on the outside of the body wall in order to guide the operator for the proper setting of the control knob. One setting, for example, may be used to dispense $1.00's worth of gasoline, another for $2.00's worth, another for $3.00's worth, another is used to indicate when the pin 59 is in the shut-off position, shown in broken lines in FIGURE 6, to render piston 37 inoperative.

When the station operator desires to hand-fill a gas tank, or when he desires to completely fill the tank and use the automatic nozzle shut-off, the only function of the device of the present invention is to serve as a channel for the flow of gasoline. The control knob is turned to the "full" position in which pin 59 at the end of the control shaft is so positioned in the path of flange 38 of the valving piston 37 as to prevent it from moving a sufficient distance to shut-off the discharge port. With the valving piston thus rendered inoperative, gasoline from the pump hose is free to flow through bore 19 into chamber 20, through by-pass channels 25 and 26 into chambers 27 and 32, and then out through discharge port 34 through bore 35 to the gasoline dispensing nozzle. The vane 28 of the compensating flap valve fits loosely enough within chamber 20 as to not substantially interfere with the free flow of gasoline.

When the operator desires to dispense a predetermined amount of gasoline fuel less than a full tank, he initially sets the control knob 52 to the appropriate setting, for example, $2.00's worth of gasoline. He then opens the nozzle and inserts it into the fill tube of the gasoline tank setting the nozzle to remain open. The gasoline then flows from the pump through the pump hose and bore 19 to chamber 20 at the pump end of the metering device. Because of the relatively loose fitting vane 28, flow is permitted past that vane into the by-pass channels 25 and 26 to chambers 27 and 32 at the opposite end of the metering device and through discharge port 34 to the nozzle.

The discharge port 34 is open because the spring tension of spring 44 urges the valving piston 37 into open position. At this time, the piston 22 is also in the open position, which is at the pump end of chamber 21. Because the flow through the by-pass channel is restricted to some extent, there is a pressure build-up in chamber 20 which exerts force on piston 22. This force is partially resisted by spring 24 and by the liquid fuel filling chamber 21 forward of the piston. However, restricted discharge flow from chamber 21 is provided by means of channel 58 in the rearward wall of control section 13, by one of the control apertures 55, 56 or 57, and by channel 53 in the control shaft.

Thus, the pressure of the gasoline on piston 22 forces the gasoline in a restricted flow out from chamber 21. Out flow through channel 61 is prevented by means of the check valve element 62. As the piston 22 moves forward, its forward face strikes the end of stem 40 of the valving piston 37 and forces it forward until the resilient disk 42 is pressed into place against the discharge port 34. The pump pressure of the gasoline in the chamber 32 behind flange 39 insures that the shut-off will remain closed until manually opened by the control knob. The rate at which the piston 22 moves forward is determined by the rate of flow through the control apertures 55, 56 or 57. This, in turn, is predetermined according to the amount of gasoline desired to be dispensed before further flow is cut-off.

The larger aperture 55 permits a greater rate of flow so that the piston 22 moves faster and actuates the valving element in a shorter length of time. Thus, control aperture 55 would be used to dispense a lesser predetermined volume of gasoline. Control aperture 57 is the smallest. Thus, it causes the piston 22 to take a longer period of time to travel the length of chamber 21 before actuating the valve for the discharge port. When the control knob is set so as to align control aperture 57 with channel 58, a greater predetermined amount of gasoline can flow through the by-pass channel before the discharge port is closed.

Meanwhile, while the metering device is functioning, the station operator can perform his other services without fear of over-filling the tank and without need to watch the metering pump. Thus, he can devote his full attention to such thingn as washing the windows, checking the oil and radiator, etc., and do these service satisfactorily. Then, when he is finished he can return to the pump.

The metering device of the present invention is subject to a number of variables at different locations. The basic price of gasoline, the Federal and local taxes, etc., may all vary. The basic price of gasoline may, in some areas, vary from day to day, particularly during time of price wars. For this reason it is not feasible to attempt to adjust each metering device to dispense an exact predetermined amount of gasoline. Instead, a small margin of safety is built into the device by setting it to dispense a small amount less than the desired predetermined.

For example, this may be from 2 or 3 to 10 cents worth of gasoline. When the operator returns to the pump he can then hand-fill this small additional amount of gasoline into the tank in a very few seconds to the exact dollar amount requested by the customer. This he does by closing the nozzle, flipping the control knob 52 to rotate it to bring pin 59 into contact with flange 38 of the valving piston to retract the valving disk 42 from the discharge opening. Then, by regulation of the control handle of the nozzle, the operator permits the small additional amount of gasoline to flow into the tank and restores the nozzle to its holder on the pump.

With the nozzle closed there is gasoline in the by-pass channel and chambers 27 and 32 under pump pressure. This pressure then urges gasoline to flow through channel 61 to dislodge valving element 62 against the pressure of retainer spring 63 to refill chamber 21. The pressure of the in-flowing gasoline, plus the pressure exerted by spring 24, is sufficient to overcome the pressure on the opposite side of piston 22 to cause it to return to its original position at the end of chamber 21 closest to the pump hose. Once the pressure of gasoline which bears against the flanges of the valving piston to hold the valving disk 42 against the discharge port is relieved by the manual cam action of pin 59, the pressure of spring 44 is sufficient to return the valving piston to its normal closed position.

Where there is a fairly marked changed in the price of gasoline, such as may occur during a price war or where the gasoline tax is increased, the metering device of the present invention can be adjusted to compensate for this change by adjusting the position of vane 28. Where there is a price increase it is desired to retard the flow of gasoline through the by-pass channel to permit lesser volume to flow during the period of time it takes piston 22 to travel far enough to actuate the shut-off valve. Conversely, when there is a decrease in price, it is desired to permit greater rate of flow so that a larger volume of gasoline will flow during the travel time of the piston.

A further means of adjustment to compensate for changes in the price of gasoline is provided by means of channel or passage 105 extending from chamber 21 to chamber 32, as shown in FIGURE 6. An intersecting threaded channel or passage 106 is fitted with a set screw 107. Screw 107 may be adjusted to close off flow through passage 105 so that the sole flow is through the control shaft or permit some flow through passage 105. When the price of gasoline is high a portion of the flow of gasoline from chamber 21 may be permitted through channel 105 so that the actuation of the shutoff is more rapid. When the price of gasoline drops the supplemental flow may be reduced or cut off so that the rate of flow from chamber 21 is reduced and a greater volume of gasoline is dispensed before shut-off. These control means may in some cases be used separately or together depending upon the amount of fluctuation in price.

Fine adjustment for greater accuracy is possible by adjusting of set screws 66 into the control apertures so as to vary the cross-section area and the rate of flow of gasoline from chamber 21 under pressure of piston 22 to control the time of travel of the piston.

In the embodiment of the invention illustrated in FIGURES 10 and 11, the metering device is incorporated into a nozzle of novel design which is provided with means for automatic shut-off when a gasoline fuel tank is full, or almost full. According to this modified embodiment of the invention a single structure may be utilized to dispense either a predetermined amount of fuel less than a full tank, or a full tank, and then shut-off automatically.

Where, in the modified structure, elements have the same structure and function they retain the same identifying numeral. Where the function or structure is similar, but not identical, the same identifying numeral has been retained along with the distinguishing character A. Thus, the modified form of metering device indicated generally at 10A includes an intermediate section 12A to which is secured a control and nozzle section 13–14A. A gasket 16A is interposed between these sections to insure a tight seal.

The intermediate section 12A includes a cylindrical piston chamber 21A in which piston 22 is fit and functions as hertofore described. The intermediate section 12A also includes a by-pass channel 25A which communicates with a mating by-pass channel 26A and chamber 27A. A loose fitting flap or butterfly type valve including flap or vane 28A, which is adapted to be adjusted by means of head 31, is fitted in the by-pass channel 26A to permit alteration of the rate of flow of gasoline through the device, but without cutting off the flow.

The chamber 27A communicates directly with a chamber 70 which is separated by means of a transverse wall 71 from a cylindrical chamber 32A, which in turn is separated from the chamber 21A of the intermediate section by means of transverse wall portion 33A. Fluid communication between chambers 32A and 70 is by means of one or more ports 72 which permit unrestricted flow of gasoline.

Chamber 27A also communicates directly with a discharge port 34A, which in turn communicates with a bore 35A through a boss 36A on the end of the section 13–14A. Box 36A functions as a fitting for attachment of a gasoline dispensing nozzle tube 73.

A piston valving element 37A is housed within cylindrical chamber 32A, which is axially aligned with piston chamber 21A and chamber 70. Piston 37A includes a flange 38A, a tubular shaft or shank portion 74 and a spacer boss 75, all axially aligned. One end of an axially aligned plunger or slidable shaft 40A, which extends through wall portion 33A and is movable in response to movement of piston 22, fits with a slide fit inside of tubular shank 74 of the piston 37A.

An annual chamber 76 is formed between the nozzle side of wall portion 33A and flange 38A, which is held spaced away from the wall by means of the spacer boss 75. An aperture 77 from by-pass channel 26A permits flow of gasoline from the by-pass channel into the annular chamber 76. Because aperture 77 is on the pump side of the flap valve 28A, the gasoline flow through aperture 77 into chamber 76 is at somewhat higher pressure than that of the restricted flow on the other side of the flap valve. A further discharge aperture 78 from chamber 76 communicates with a small diameter high pressure gasoline flow tube 79 which extends to the end of the nozzle tube 73.

A ball valving member 80 is retained in chamber 70 during the period when the valve is open and flow through the device is permitted. Ball 80 is dislodged to the broken line position to close discharge port 34A by action of the piston shank 74 exerted against ball 80. When in the open position, ball 80 is retained in chamber 70 by action of retaining member 81 which is resiliently mounted in transverse radial well 82 by means of coil spring 83.

Retaining member 81 is connected to a sliding radially disposed shaft 84 which extends through the bottom of well 82 and is connected to a longitudinal arm 85, which carries a valving member 86 at its opposite end. Arm 85 extends through by-pass channel 26A and valving element 86 is located at the entrance to aperture 77. Vane 28A may be provided with a slot 87 to permit passage of arm 85. When ball 80 is dislodged from its open position in chamber 70 into its closed position against discharge port 34A, coil spring 83 pushes retaining element 81 outwardly from well 82 toward chamber 70 and at the same time lifts arm 85 through its connection with shaft 84. This causes valving element 86 to close the aperture 77. This prevents any flow into the gas tank through chamber 76 and tube 79 when the nozzle valve is closed.

Valving ball 80 is normally maintained in its closed position against discharge port 34A by the line pressure of gasoline in chamber 27A against the ball. Out of an abundance of caution, further retaining means are desirably provided in the form of a retainer element 88 having a stem 89 which extends through an open spider element in chamber 27A. A head or stop 91 on the opposite end of stem 89 limits upward movement of the retainer element under pressure exerted by coil spring 92. Spider 90 is solely for the purpose of positioning the retaining element and is open so as to not materially retard the flow of gasoline through the nozzle when the valve ball 80 is in its open position.

As heretofore described, the metering device of the present invention is designed to automatically meter an amount of gasoline just short of the desired amount in order to provide a margin of safety to accommodate varying flow rates and pressures, etc. Then, the last remaining small amount of gasoline is dispensed by hand. In the combined metering device and nozzle this is accomplished by means of a pin 94 having an exposed head 95 located in an open well 96 in a boss 97 on the top of the combined nozzle structure. A collar member 98 functions to limit outward movement of pin 94 under pressure exerted by coil spring 99. Inward movement of pin 94 is limited by the relative inaccessibility of the exposed head 95. The head 94 can be depressed slightly, sufficient to cause the opposite end of pin 94 to slightly unseat ball valving member 80 from the discharge port 34A. The force exerted by the pin is against the line pressure of the gasoline and the spring pressure of spring 92 against retainer 88. It is sufficient, however, to permit limited flow around the ball valving element sufficient to bring the gasoline dispensed quickly up to the amount requested by the customer.

A plunger including a piston 100 slidable in channel 101 in response to force exerted on head 102 and stem 103 is provided to dislodge ball valving element 80 from its closed position and return it to its open position in chamber 70 to reinitiate dispensing flow of gasoline. Channel 101 is in approximate axial alignment with chamber 21A, piston 22, plunger 40A, piston 37A, etc. When plunger head 102 is depressed against pressure of coil spring 104 and moved the full distance shown in broken lines in FIGURE 10, the ball element 80 is moved out of its closed position and into positive retention in chamber 70. As the ball is pushed into chamber 70, it depresses retainer element 80 and shaft 84 to reopen gas flow aperture 77 by dislodging valving element 86. As shown in FIGURE 11, a slightly modified form of control shaft 47A is mounted in the housing in the wall of piston chamber 32A. An oblique gas passage 58A is provided from chamber 21A to the restricted apertures of the control shaft.

In the operation of the combined metering device and nozzle structure to dispense a predetermined dollar amount of gasoline, the combined device functions substantially as described for the metering device alone. The operator sets the control knob to the appropriate setting and opens the nozzle by depressing plunger head 102. This seats the valving ball 80 in its open position. Gas flows through the by-pass channel into chamber 27A and out through the discharge port 34A and through nozzle 73 into the fuel tank of the automobile being serviced. At the same time there is a lesser volume but higher pressure gas flow through aperture 77, chamber 76, aperture 78 and tube 79 out through the nozzle tube 73.

The higher line pressure of the gasoline exerted upon piston 22 pushes the piston forward in chamber 21A forcing the gasoline in that chamber out through the restricted timing aperture of the control shaft. As the piston 22 moves forward it engages plunger 40A forcing it forward to dislodge valving ball 80 into its shut-off position against the discharge port 34A. At the same time valve 86 closes aperture 77 so that no further flow of gasoline occurs. Then when the attendant returns to the nozzle he depresses head 95 of pin 104 sufficient to dislodge the valving ball 80 to dispense whatever small additional quantity of gasoline may be necessary to bring the total amount up to that ordered by the customer, less than a tank full.

When a customer orders a full tank the attendant adjusts the control knob to the "full" position, in which the restricted flow apertures of the control shaft are completely shut off. He inserts the nozzle into the fill tube of the automobile gas tank and initiates flow by pressing the head 102 of plunger 100 to seat the ball valve element 80 in its open position and, at the same time, unseat valving element 86 from aperture 77. The large volume flow is through the by-pass channel and out through the open discharge port and the nozzle. At the same time there is a lesser volume but higher pressure flow through aperture 77, chamber 76, aperture 78 and tube 79 through the nozzle. Piston 22 remains in its normal at-rest position at the pump end of chamber 21A because there is no open aperture through which the gasoline can be forced from chamber 21A by movement of the piston 22.

As the level of gasoline in the fuel tank approaches the full level, the level of gasoline in the fill tube rises until it is above the open end of the nozzle tube 73. This creates a hydrostatic head which causes a pressure buildup within tube 79 and chamber 76. This pressure is exerted against flange 38A causing piston member 37A to be forced forward, the shank 74 of the piston 37A pushing against valve ball 80 and dislodging it from its open position to the closed position against the entrance to the discharge port 34A. This shut-off occurs rapidly to stop the gas flow without overflow. Aperture 77 is closed at the same time discharge port 34A is closed. Again, if the shut-off occurs before the tank is completely full, the operator may press head 95 of pin 94 to dislodge the valving ball 80 slightly to permit whatever additional small flow of gasoline may be necessary.

Because plunger 40A fits with a slide fit within the tubular shank 74, the piston 37A may move forward independently of plunger 40A. Piston 37A is returned positively by action of plunger 100 against valve ball 80.

By omitting the elements of the metering device for metering less than a full tank the simplified novel nozzle structure described may be used to replace the more elaborate conventional automatic nozzle.

There is shown novel metering structure which may be utilized as an accessory device in conjunction with a conventional gasoline dispensing nozzle or as a replacement for substitute for a conventional nozzle. The device enables a filling station operator to dispense a predetermined dollar amount of gasoline or a full tank with automatic shut-off. This enables the attendant to devote his full attention to other services. Particularly it enables him to service several automobiles at once without fear of overflow of fuel.

As an added precaution, a filtering device may be installed in the hose line ahead of the metering device or in the metering device itself. Desirably this filter is in the form of a magnetic screen to attract metallic particles or other contaminants which may escape the filter of the gasoline pump.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A liquid metering device with automatic shut-off for dispensing a predetermined volume of liquid from a supply of that liquid under pressure, said device comprising
   (1) a body having means at one end for securing to a supply line of the liquid and means for discharge of liquid from the device,
   (2) a liquid flow passage extending from the supply line end of said body to the discharge means,
   (3) a shut-off valving means in said passage adjacent the discharge means,
   (4) a piston chamber within said body open at one end to the supply line end of said liquid flow passage,
   (5) sliding shaft means extending into the opposite end of said piston chamber and moveable to actuate said shut-off valving means,
   (6) a piston moveable in said chamber in response to fluid pressure exerted against it,
   (7) said piston being independently movable and normally urged by spring means out of contact with said shaft means, when moved in the direction toward the discharge from the body in response to liquid pressure against the piston, being moveable into contact with said shaft means for actuating said shut-off valving means, and,
   (8) a restricted liquid flow passage from the discharge end of said piston chamber to the discharge end of said first named liquid flow passage.

2. A metering device according to claim 1 further characterized in that said restricted liquid flow passage includes one segment through the wall of said piston chamber and another segment of lesser diameter extending transversely through a rotatable shaft journalled in the wall of said body.

3. A metering device according to claim 1 further characterized in that the discharge end of said liquid flow passage is provided with a dispensing tube adapted for insertion in the fill tube of a tank.

4. A metering device according to claim 2 further characterized in that a plurality of restricted flow passage segments of differing diameters extend transversely through said rotatable shaft and said rotatable shaft is provided with external control knob means, whereby one of several different restricted flow passage segments of differing diameters may be aligned with the larger diameter segment of the restricted flow passage through the wall of the piston chamber upon rotation of said shaft by said knob.

5. A liquid metering device with automatic shut-off for dispensing a predetermined volume of liquid from a supply of that liquid under pressure, said device comprising
   (1) a body having means at one end for securing to a supply line of the liquid and means for discharge of liquid from the device,
   (2) a liquid flow passage extending from the supply line end of said body to the discharge means,
   (3) a shut-off valving means in said passage adjacent the discharge means,
   (4) a piston chamber within said body open at one end to the supply line end of said liquid flow passage,
   (5) sliding shaft means extending into the opposite end of said piston chamber and movable to actuate said shut-off valving means,
   (6) a piston movable in said chamber in response to fluid pressure exerted against it,
   (7) said piston when moved in the direction toward the discharge from the body being movable into contact with said shaft means for actuating said shut-off valving means,
   (8) a restricted liquid flow passage from the discharge end of said piston chamber to the discharge end of said first named liquid flow passage,
   (9) said restricted liquid flow passage including one segment through the wall of said piston chamber and another segment of lesser diameter extending transversely through a rotatable shaft journalled in the wall of said body,
   (10) a threaded passage in said rotable shaft extending generally longitudinally and intersecting said transversely extending passage segment, and
   (11) a set screw in said threaded passage, whereby the cross sectional area of said transversely extending passage segment can be altered.

6. A liquid metering device with automatic shut-off for dispensing a predetermined volume of liquid from a supply of that liquid under pressure, said device comprising
   (1) a body having means at one for securing to a supply line of the liquid and means for discharge of liquid from the device,
   (2) a liquid flow passage extending from the supply line end of said body to the discharge means,
   (3) a shut-off valving means in said passage adjacent the discharge means,
   (4) a piston chamber within said body open at one end to the supply line end of said liquid flow passage,
   (5) sliding shaft means extending into the opposite end of said piston chamber and moveable to actuate said shut-off valving means,
   (6) said shut-off valving means comprising a discharge port and a movable shut-off member adapted to seat in said discharge port, said sliding shaft means being elongated and extending through the end wall of the piston chamber into the path of travel of said movable shut-off member to move the same into shut-off positions,
   (7) a piston movable in said piston chamber in response to fluid pressure exerted against it,
   (8) said piston when moved in the direction toward the discharge from the body being movable into contact with said shaft means for actuating said shut-off valving means, and,
   (9) a restricted liquid flow passage from the discharge end of said piston chamber to the discharge end of said first named liquid flow passage.

7. A liquid metering device with automatic shut-off for dispensing a predetermined volume of liquid from a supply of that liquid under pressure, said device comprising
   (1) a body having means at one end for securing to a supply line of the liquid and means for discharge of liquid from the device,
   (2) a liquid flow passage extending from the supply line end of said body to the discharge means,
   (3) a shut-off valving means in said passage adjacent the discharge means,
   (4) a piston chamber within said body open at one end to the supply line end of said liquid flow passage,
   (5) sliding shaft means extending into the opposite end of said piston chamber and movable to actuate said shut-off valving means,
   (6) a piston movable in said chamber in response to fluid pressure exerted against it,
   (7) said piston when moved in the direction toward the discharge from the body being movable into contact with said shaft means for actuating said shut-off valving means,
   (8) a restricted liquid flow passage from the discharge end of said piston chamber to the discharge end of said first named liquid flow passage, and
   (9) channel means between the piston chamber and the discharge end of the liquid flow passage, said channel means being of substantially greater cross sectional area than said restricted flow passage and fitted with one-way check valve means to permit liquid flow only in the direction toward the piston chamber.

8. A liquid metering device with automatic shut-off for dispensing a predetermined volume of liquid from a supply of that liquid under pressure, said device comprising
  (1) a body having means at one end for securing to a supply line of the liquid and means for discharge of liquid from the device,
  (2) a liquid flow passage extending from the supply line end of said body to the discharge means,
  (3) flow regulating means in said liquid flow passage to permit variation in rate of flow without preventing flow, said means comprising a loosely fitting flap valve,
  (4) a shut-off valving means in said liquid flow passage adjacent the discharge means,
  (5) a piston chamber within said body open at one end to the supply line end of said liquid flow passage,
  (6) sliding shaft means extending into the opposite end of said piston chamber and movable to actuate said shut-off valving means,
  (7) a piston movable in said chamber in response to fluid pressure exerted against it,
  (8) said piston when moved in the direction toward the discharge from the body being movable into contact with said shaft means for actuating said shut-off valving means, and,
  (9) a restricted liquid flow passage from the discharge end of said piston chamber to the discharge end of said first named liquid flow passage.

9. A liquid metering device with automatic shut-off for dispensing a pretermined volume of liquid from a supply of that liquid under pressure, said device comprising
  (1) a body having means at one end for securing to a supply line of the liquid and means for discharge of liquid from the device,
  (2) a liquid flow passage extending from the supply line end of said body to the discharge means,
  (3) a shut-off valving means in said passage adjacent the discharge means,
  (4) a piston chamber within said body open at one end to the supply line end of said liquid flow passage,
  (5) sliding shaft means extending into the opposite end of said piston chamber and movable to actuate said shut-off valving means,
  (6) a piston movable in said chamber in response to fluid pressure exerted against it,
  (7) said piston when moved in the direction toward the discharge from the body being movable into contact with said shaft means for actuating said shut-off valving means,
  (8) said shut-off valving means comprising a discharge port in substantially axial alignment with said piston chamber, a spool piston in substantially axial alignment with said piston chamber between said chamber and discharge port having a shut-off member at one end adapted to seat in said discharge port,
  (9) said sliding shaft means for actuating said valving means comprising an elongated stem at the opposite end of the spool piston extending through the end wall of the piston chamber into the path of travel of the piston therein, and
  (10) a restricted liquid flow passage from the discharge end of said piston chamber to the discharge end of said first named liquid flow passage.

10. A metering device according to claim 9 further characterized in that the end of said elongated stem of said spool piston extending into the piston chamber is spring loaded to normally urge said shut-off valving means into open position.

11. A metering device according to claim 9 further characterized in that said spool piston includes a pair of spaced apart annular flanges, a rotatable shaft provided with external knob means is journalled in the wall of the body generally perpendicular to the path of travel of said spool piston off-center, cam means are provided on the internal end of said rotatable shaft which extend into the path of travel of the flanges of said spool piston, whereby movement of said spool piston may be prevented by rotation of said shaft by said knob to bring said cam means into engagement with one of said flanges.

12. A metering device according to claim 6 further characterized in that said movable shut-off member is a ball valving element.

13. A liquid metering device with automatic shut-off for dispensing a predetermined volume of liquid from a supply of that liquid under pressure, said device comprising
  (1) a body having means at one end for securing to a supply line of the liquid and means for discharge of liquid from the device,
  (2) a liquid flow passage extending from the supply line end of said body to the discharge means,
  (3) a shut-off valving means in said passage adjacent the discharge means,
  (4) the discharge end of said liquid flow passage being provided with a dispensing tube adapted for insertion in the fill tube of a tank,
  (5) said shut-off valving means comprising a discharge port controlling flow from said dispensing tube and a movable shut-off member adapted to seat in said discharge port,
  (6) a first piston chamber within said body open at one end to the supply line end of said liquid flow passage,
  (7) sliding shaft means extending into the opposite end of said first piston chamber and movable to actuate said shut-off valving means,
  (8) a first piston movable in said chamber in response to fluid pressure exerted against it,
  (9) said first piston when moved in the direction toward the discharge from the body being movable into contact with said shaft means for actuating said shut-off valving means,
  (10) a restricted liquid flow passage from the discharge end of said first piston chamber to the discharge end of said first named liquid flow passage,
  (11) a flanged second piston having a tubular member in sliding engagement with said sliding shaft means for actuating the shut-off valving means,
  (12) said flanged piston being housed within a second piston chamber and movable separately from said sliding shaft means to independently actuate said shut-off valving means, and
  (13) means responsive to the level of liquid in a tank being filled to initiate movement of said flanged piston to actuate the valving means.

14. A metering device according to claim 13 further characterized in that said means responsive to the level of liquid in a tank includes a pressure reducing valve in said first named liquid flow passage, a reduced volume-higher pressure liquid flow passage extending from the higher pressure side of said pressure reducing valve through the chamber housing said flanged piston to the open end of said dispensing tube, and valve means responsive to said shut-off valving means for interrupting flow in said reduced volume flow passage.

15. A liquid metering device comprising a body having means at one end for securing to a supply line of liquid under pressure and having a dispensing tube adapted for insertion in the fill tube of a tank, a liquid flow passage extending from the supply line end of said body to the dispensing tube, shut-off valving means in said passage adjacent the dispensing tube, said valving means comprising a discharge port controlling flow from said dispensing tube and a movable shut-off member adapted to seat in said discharge port, a piston housed within a piston chamber independently movable relative to said movable shut-off member and movable in response to fluid pressure to actuate said shut-off valving means, and means responsive to the level of liquid in a tank being filled to initiate movement of said piston to actuate said valving means.

16. A liquid metering device comprising a body having means at one end for securing to a supply line of liquid under pressure and having a dispensing tube adapted for insertion in the fill tube of a tank, a liquid flow passage extending from the supply line end of said body to the dispensing tube, shut-off valving means in said passage adjacent the dispensing tube, said valving means comprising a discharge port controlling flow from said dispensing tube and a movable shut-off member adapted to seat in said discharge port, a piston housed within a piston chamber and movable in response to fluid pressure to actuate said shut-off valving means, and means responsive to the level of liquid in a tank being filled to initiate movement of said piston to actuate said valving means, said means responsive to the level of liquid in a tank including a pressure reducing valve in said first named liquid flow passage, a reduced volume-higher pressure liquid flow passage extending from the higher pressure side of said pressure reducing valve through the chamber housing said piston to the open end of said dispensing tube, and valve means responsive to said shut-off valving means for interrupting flow in said reduced volume flow passage.

17. An adjustable gasoline metering device with automatic shut-off for dispensing any of several predetermined amounts of gasoline from a gasoline pump to a dispensing nozzle, said device comprising
(1) a body having means at one end for securing to the hose of a gasoline pump and at the other end for attachment of a conventional gasoline pump nozzle,
(2) a gasoline flow passage extending through said body from the hose end to the nozzle end,
(3) a piston chamber within said body open at one end to the hose end of the gasoline flow passage,
(4) a spring loaded piston in said piston chamber movable in response to fluid pressure of gasoline exerted against it and normally urged in the direction toward the open end of the piston chamber,
(5) a normally open shut-off valving means in said gasoline flow passage adjacent the nozzle end thereof, said valving means comprising
   (a) a discharge port in substantially axial alignment with said piston chamber,
   (b) a spool piston in substantially axial alignment with said piston chamber between said chamber and discharge port,
   (c) said piston having a pair of spaced apart annular flanges,
   (d) resilient means at one end of said spool piston adapted to seat in said discharge port,
   (e) an elongated spring loaded stem at the opposite end of said spool piston extending through the end wall of said piston chamber toward the nozzle into the path of travel of the piston therein, and normally urged away from said discharge port, said piston in said piston chamber being movable into contact with said elongated stem to actuate said shut-off valving means,
(6) a rotatable shaft journalled in the wall of the body generally perpendicular to the axis of said spool piston,
(7) an external control knob for rotating said shaft,
(8) a restricted gasoline discharge passage from the nozzle end of the piston chamber to the nozzle end of the gasoline flow passage, said restricted passage including
   (a) one segment through one end wall of the piston chamber and
   (b) a plurality of separate restricted passage segments of differing diameters smaller than said first segment extending transversely through said rotatable shaft, whereby one of several different restricted passage segments may be aligned with said first segment upon rotation of said shaft by said knot,
(9) off-center cam means on the internal end of said rotatable shaft, said cam means extending into the path of travel of the flanges of said spool piston, whereby movement of said spool piston may be prevented by rotation of said shaft to bring said cam means into engagement with one of said flanges, and
(10) channel means between said piston chamber and the nozzle end of said gasoline flow passage, said channel means being of substantially greater cross-sectional area than said restricted discharge passage and fitted with one-way check valve means to permit liquid flow only in the direction toward the piston chamber.

18. A metering device according to claim 17 further characterized in that flow regulating means comprising a loosely fitting flap valve are provided in said gasoline flow passage to permit variation in rate of gasoline flow without preventing flow.

19. A liquid metering device for dispensing a predetermined volume of liquid from a supply of that liquid under pressure, said device comprising a body having means at one end for securing to a supply line of the liquid and at the other end for attachment of a nozzle, a liquid flow passage extending from the supply line end of said body to the nozzle end, a normally open shut-off valving means in said passage adjacent the nozzle end, a piston chamber within said body open at one end to the supply line end of said liquid flow passage, means extending into the opposite end of said piston chamber connected to said shut-off valving means and movable to move said valving means into closed position, a piston movable in said chamber in response to fluid pressure exerted against it, said piston being independently movable and normally urged by spring means out of contact with said moving means for said shut-off valving means, said piston being movable into contact with said moving means for said shut-off valving means, and restricted liquid discharge passage from said piston chamber to the nozzle end of said first liquid flow passage.

References Cited by the Examiner
UNITED STATES PATENTS 2,219,761 10/1940 Burdick _____ 251—23
2,587,839  3/1952 Grise _____ 141—215

LOUIS J. DEMBO, *Primary Examiner.*